United States Patent [19]
Herrmann

[11] 3,743,082
[45] July 3, 1973

[54] DISPENSING CONTAINER

[76] Inventor: Nancy A. Herrmann, 2408 Roscomare Road, Los Angeles, Calif. 90024

[22] Filed: Aug. 23, 1971

[21] Appl. No.: 173,856

[52] U.S. Cl. .......................... 206/1 R, 206/DIG. 33
[51] Int. Cl. ............................................. A45c 11/00
[58] Field of Search ................... 206/1 R, DIG. 33; 221/211, 212, 241, 312

[56] References Cited
UNITED STATES PATENTS
| | | | |
|---|---|---|---|
| 3,587,835 | 6/1971 | Shore | 206/1 R |
| 2,848,006 | 8/1958 | Simpson | 206/1 R X |

FOREIGN PATENTS OR APPLICATIONS
| | | | |
|---|---|---|---|
| 338,656 | 11/1930 | Great Britain | 221/212 |

Primary Examiner—George E. Lowrance
Assistant Examiner—Steven E. Lipman
Attorney—Jessup & Beecher

[57] ABSTRACT

An improved dispensing container is provided for dispensing paper clips, hairpins, and other metallic objects. The container includes a rod which extends from the bottom of the container and through a dispensing opening in the top of the container. A permanent magnet is embedded in the upper end of the rod, and in the vicinity of the opening in the top member, so that the paper clips, or the like may be dispensed through the opening, and with the permanent magnet inhibiting the free flow of the articles through the opening and presenting the articles in an easily reached position.

3 Claims, 3 Drawing Figures

PATENTED JUL 3 1973
3,743,082
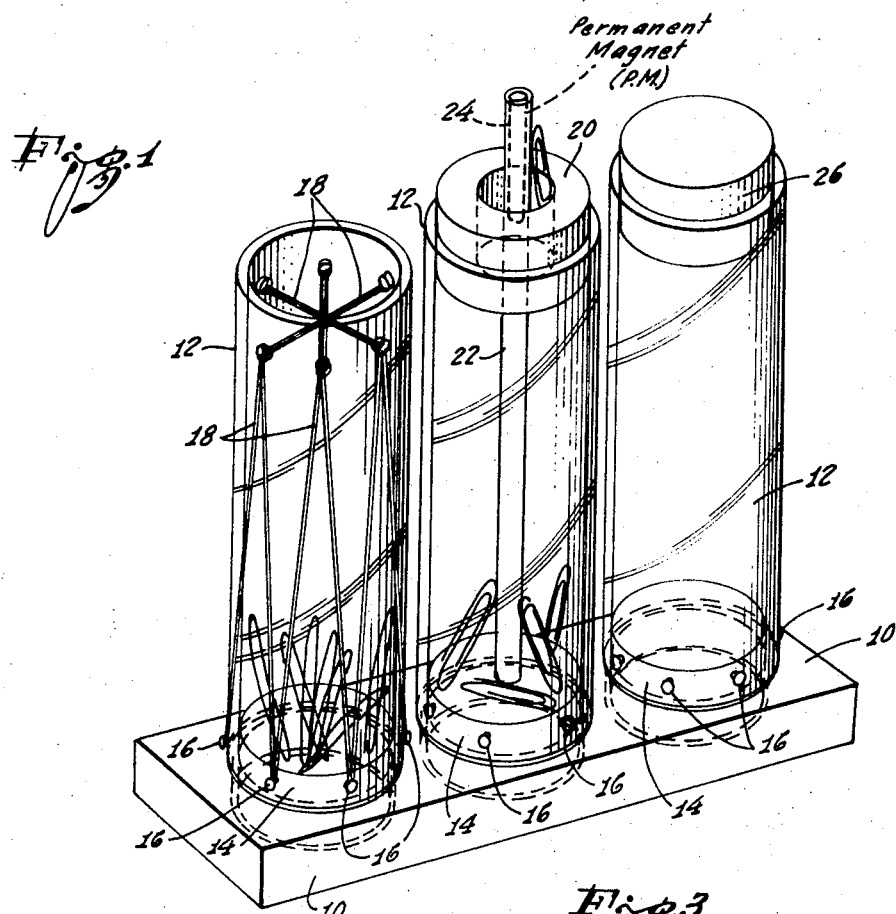
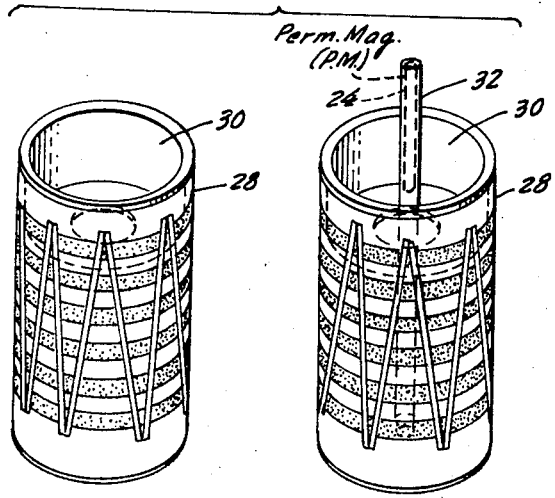
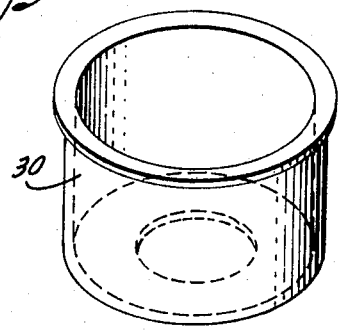
INVENTOR
Nancy A. Herrmann
Jessup and Beecher
By Keith D. Beecher
ATTORNEYS

DISPENSING CONTAINER

BACKGROUND OF THE INVENTION

Magnetic dispensing containers are known to the art and, as such, utilize a permanent magnet to restrain the inadvertent removal of the articles, such as paper clips, therefrom even when the container is inadvertently turned over. These magnetic dispensers permit the articles to be dispensed, by a shaking action, on an individual basis, through a relatively large dispensing opening provided in the top of the container.

The present invention provides an improved magnetic dispensing container, and which provides an efficient magnetic means for effecting the dispensing action; and one which has no tendency to cause the dispensed articles to cling together or to bunch, which would impede the ease with which the articles may be individually selected from the dispensing container.

In the operation of the dispensing container, it is turned over and gently shaken so as to expose one or more of the paper clips through the opening at its top, and the permanent magnet is disposed in a central rod, so that the exposed paper clips cling to the upper end of the rod and may then be picked off on an individual basis from the rod which extends through the dispenser.

The dispensing container of the invention also has the advantage in that the same container, but with the rod and permanent magnet removed, may be used, either with or without slight modifications, for dispensing non-metallic articles, such as rubber bands, or the like. This feature provides a simple means for the commercial fabrication of pairs of units, similarly constructed and similar in appearance, with one being used to dispense metallic objects such as paper clips, and the other being used to dispense non-metallic objects such as rubber bands. The concept also permits further containers of similar construction to be provided, and which may be equipped with a top, so as to serve as a receptacle for other small objects, such as golf tees, buttons, cuff links, and the like.

BRIEF DESCRIPTION OF THE DRAWING

FIG. 1 is a perspective representation of one embodiment of the invention, in which a dispensing device constructed in accordance with the invention is supported on a base with other similar dispensing devices;

FIG. 2 is a second embodiment of the dispensing container of the invention, together with a similar container for dispensing non-metallic objects; and FIG. 3 is a perspective representation of the top member which is used in both the containers of FIG. 2.

DETAILED DESCRIPTION OF THE ILLUSTRATED EMBODIMENTS

In the embodiment of FIG. 1, a base 10 is provided which may be composed, for example, of wood, plastic or other appropriate materials. The base 10 is provided with three circular wells in the illustrated embodiment, and three cylindrical receptacles designated 12 are supported in the respective wells by their disc-like bottom members 14. The bottom members 14 extend down into the wells and into the interior of the respective cylinders to form bottm enclosures for the cylinders. The cylinders 12 may be formed, for example, of glass, or of a clear or opaque plastic material, or of any other appropriate substance.

A plurality of pins 16 are mounted around the periphery of each of the cylindrical receptacles 12 adjacent the bottom, as shown. These pins may be disposed at equi-angular positions, and in the case of the center and right-hand receptacles of FIG. 1, hold the bottom members in place.

In the case of the left-hand receptacle in FIG. 1, a plurality of corresponding holes are formed in the cylinder 12 adjacent the top, and strings, or resilient bands are threaded around the pins 16 and through the holes as shown, so as to provide a restriction for the articles to be dispensed from that receptacle. The articles, for example rubber bands, are loaded into the receptacle. Then, when a rubber band is required, the left-hand receptacle is removed from the well in the base, and is shaken to dispense the rubber bands on an individual basis.

The central receptacle or container in FIG. 1 is constructed to incorporate the concepts of the invention, and it is provided with a cylindrical top 20 having a central opening. A rod 22 is removably attached to the bottom 14 of the central container, and extends upwardly through the container in coaxial relationship with the cylinder 12 and through the central opening in the top member 20. A permanent magnet 24 is embedded in the upper end of the rod-like member.

The central receptacle is intended, for example, to dispense paper clips, or other metallic objects. The objects are dispensed by removing the central container from its well in the base 10, and by turning it upside down and by shaking the paper clips up to the vicinity of the opening in the top member 20, so that several of the clips are exposed. Then, the clips may be selected at will, as they cling by magnetic attraction against the protruding end of the rod-like member 22.

The left-hand receptacle in FIG. 1 may be used, for example, as a container for small objects, as suggested above. The latter receptacle may be provided with a round top 26 which is inserted into the open top of the cylinder 12.

In the embodiment of FIG. 2, a cylinder 28 is formed, for example, by a plastic or cardboard material, or the like, to form a container. The lower end of the container is enclosed by a disc-like bottom composed, for example, of metal. In the illustrated embodiment, a round cup-like top 30 is provided for the container, and having a central opening in its bottom. The cup-like member 30 is held in the upper end of the container by frictional engagement. An elongated rod 32, as in the previous embodiment, is affixed to the bottom, and the rod extends through the opening in the top member 30. A permanent magnet 24 is embedded in the rod 32.

The dispensing container of FIG. 2 operates in the same manner as the dispensing container of FIG. 1. In the latter embodiment, and as represented by the left-hand receptacle in FIG. 2, a dispensing container for rubber bands, and the like, may be provided, merely by removing the rod 32 and its embedded permanent magnet 24.

The embodiment of FIG. 1 may be merchandised, for example, as three receptacles on a common base, as shown in FIG. 1, or by two receptacles, such as the rubber band dispensing container and the paper clip dispensing container, on a common base. Likewise, the embodiment of FIG. 2 may be merchandised in pairs, with one container of each pair being equipped with the rod 32 and permanent magnet 24 for dispensing paper clips, and the like.

In both instances, the invention has the advantage in that a simple modification permits the paper clip dispensing container to be modified so as to form the rubber band dispensing container, so that the items may be sold on an economic basis as pair, or in sets of three, as is desired.

It will be appreciated that while particular embodiments of the invention have been shown and described, modifications may be made. It is intended in the following claims to cover the modifications which come within the spirit and scope of the invention.

What is claimed is:

1. A dispensing container for paper clips, and the like, comprising: a tubular housing, a top member being positioned in the upper end of said housing; an elongated rod-like member attached to the bottom of said housing and extending through an aperture in said top member; and a permanent magnet mounted in said rod-like member in the vicinity of the aforesaid aperture; said top member having a disc-shaped configuration.

2. The dispensing container defined in claim 1, in which said top member has a tubular cup-like shape.

3. The dispensing container defined in claim 1, in which said aperture in said top member is centrally located, and said rod-like member extends along the longitudinal axis of said tubular housing in coaxial relationship therewith.

* * * * *